(12) United States Patent
Han et al.

(10) Patent No.: US 12,461,635 B2
(45) Date of Patent: Nov. 4, 2025

(54) DISPLAY DEVICE

(71) Applicant: Samsung Display Co., Ltd., Yongin-si (KR)

(72) Inventors: Inyoung Han, Yongin-si (KR); Hwan-Hee Jeong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/954,272

(22) Filed: Nov. 20, 2024

(65) Prior Publication Data

US 2025/0244851 A1 Jul. 31, 2025

(30) Foreign Application Priority Data

Jan. 29, 2024 (KR) .................. 10-2024-0013317

(51) Int. Cl.
*G06F 3/041* (2006.01)
*G06F 3/044* (2006.01)

(52) U.S. Cl.
CPC .. *G06F 3/0446* (2019.05); *G06F 2203/04111* (2013.01)

(58) Field of Classification Search
CPC ............ G06F 3/0446; G06F 2203/04111
See application file for complete search history.

(56) References Cited

U.S. PATENT DOCUMENTS

| | | | |
|---|---|---|---|
| 9,342,193 B2 | 5/2016 | Ye et al. | |
| 9,465,462 B2 | 10/2016 | Jeong et al. | |
| 10,707,280 B2 | 7/2020 | Jeong et al. | |
| 2018/0061897 A1 | 3/2018 | Oh et al. | |
| 2018/0074554 A1 | 3/2018 | Hong et al. | |
| 2021/0083014 A1 | 3/2021 | Yang et al. | |
| 2021/0191566 A1 | 6/2021 | Yang et al. | |
| 2021/0357057 A1 | 11/2021 | Kim et al. | |
| 2023/0217778 A1 | 7/2023 | Han et al. | |
| 2023/0409139 A1 | 12/2023 | Li | |
| 2024/0160313 A1* | 5/2024 | Han | G06F 3/0448 |
| 2024/0224701 A1* | 7/2024 | Lee | G06F 3/0443 |

FOREIGN PATENT DOCUMENTS

| | | |
|---|---|---|
| CN | 115113764 A | 9/2022 |
| KR | 10-2012-0035744 A | 4/2012 |
| KR | 10-1453162 B1 | 10/2014 |
| KR | 10-2386894 B1 | 4/2022 |
| KR | 10-2023-0103392 A | 7/2023 |
| KR | 10-2596850 B1 | 11/2023 |

* cited by examiner

*Primary Examiner* — Deeprose Subedi
(74) *Attorney, Agent, or Firm* — Womble Bond Dickinson (US) LLP

(57) ABSTRACT

Provided is a display device including a display panel and an input-sensing panel including an encapsulation substrate and a sensing circuit layer, wherein the sensing circuit layer includes first sensing electrodes, second sensing electrodes, first trace lines, second trace lines, and third trace lines respectively connected to first ends of the first sensing electrodes, each of the third trace lines respectively adjacent to the first ends of the first sensing electrodes including a first conductive pattern, a second conductive pattern, and a bridge pattern extending from a sensing pattern and connected to the first conductive pattern and the second conductive pattern.

20 Claims, 12 Drawing Sheets

DISPLAY DEVICE

CROSS-REFERENCE TO RELATED APPLICATION

The present application claims priority to, and the benefit of, Korean Patent Application No. 10-2024-0013317, filed on Jan. 29, 2024, in the Korean Intellectual Property Office, the entire disclosure of which is incorporated herein by reference.

BACKGROUND

1. Field

The present disclosure herein relates to a display device including an input-sensing panel having reduced dead space and reduced resistance.

2. Description of the Related Art

A display device may include a display panel for displaying an image and an input-sensing panel for sensing an external input. The input-sensing panel may include sensing electrodes, trace lines, and sensing pads. As the number of the sensing electrodes increases to improve sensing sensitivity, the number of the trace lines may increase as well. As the number of the trace lines increases, space for a peripheral region in which the trace lines are to be located is required.

SUMMARY

The present disclosure provides trace lines in a multilayer structure in a region in which trace lines are densely located, thereby reducing dead space of an input-sensing panel, and reducing resistance of the trace lines.

The present disclosure provides a light-emitting element having modified surface characteristics by introducing a ligand that improves dispersibility to a surface of a main body of the light-emitting element.

One or more embodiments of the present disclosure provide a display device including a display panel including an active region in which pixels are located, and a peripheral region adjacent to the active region, and an input-sensing panel including a sensing circuit layer and an encapsulation substrate above the display panel, wherein the sensing circuit layer includes first, second, and third sensing insulating layers sequentially stacked above the display panel, first sensing electrodes extending along a first direction, and arranged along a second direction crossing the first direction, second sensing electrodes including sensing patterns arranged along the second direction, and connection patterns respectively between adjacent ones of the sensing patterns, extending along the second direction, and arranged along the first direction, first trace lines respectively connected to first ends of the second sensing electrodes, second trace lines respectively connected to second ends of the second sensing electrodes, and third trace lines respectively connected to first ends of the first sensing electrodes, and including a first conductive pattern, a second conductive pattern overlapping the first conductive pattern, and having a width that is less than a width of the first conductive pattern in the first direction, and a bridge pattern extending from one of the sensing patterns, and connected to the first conductive pattern and the second conductive pattern.

The first conductive pattern and the second conductive pattern may include molybdenum-based metal, wherein the bridge pattern includes a transparent conductive oxide.

The first conductive pattern may be above the encapsulation substrate, and is covered by the first sensing insulating layer, wherein the second conductive pattern is above the first sensing insulating layer, and is covered by the second sensing insulating layer, and wherein the bridge pattern is above the second sensing insulating layer, and is covered by the third sensing insulating layer.

In plan view, a portion of an upper surface of the first conductive pattern may be exposed from the second conductive pattern.

A first contact hole overlapping the portion may be defined in the first sensing insulating layer and the second sensing insulating layer, wherein a second contact hole overlapping the second conductive pattern is defined in the second sensing insulating layer, and wherein the bridge pattern is connected to the portion through the first contact hole, and is connected to the second conductive pattern through the second contact hole.

A contact hole overlapping the portion, and exposing a side surface and a portion of an upper surface of the second conductive pattern, may be defined in the first sensing insulating layer and the second sensing insulating layer, wherein the bridge pattern is connected to the portion of the first conductive pattern, and to the side surface and the portion of the second conductive pattern, through the contact hole.

The connection patterns may be above the encapsulation substrate, and may be covered by the first sensing insulating layer, wherein the sensing patterns and the second sensing electrodes are above the second sensing insulating layer, and are covered by the third sensing insulating layer, and wherein the sensing patterns are connected to the connection patterns through connection contact holes defined in the first sensing insulating layer and the second sensing insulating layer.

The bridge patterns may include integrated pattern extending from the sensing patterns.

The display device may further include junction patterns adjacent to the first ends of the second sensing electrodes to which the first trace lines are connected, to the second ends of the second sensing electrodes to which the second trace lines are connected, and to the first ends of the first sensing electrodes to which the third trace lines are connected.

The junction patterns may be above the encapsulation substrate, and are covered by the first sensing insulating layer, wherein the bridge pattern is connected to one of the junction patterns through a first junction contact hole defined in the first sensing insulating layer and the second sensing insulating layer.

The junction patterns may be above the first sensing insulating layer, and may be covered by the second sensing insulating layer, wherein the bridge pattern is connected to one of the junction patterns through a second junction contact hole defined in the second sensing insulating layer.

A portion of the third trace lines adjacent to the second ends of the second sensing electrodes may include lower patterns above the encapsulation substrate, wherein a remaining portion of the third trace lines adjacent to the second ends of the second sensing electrodes includes upper patterns not overlapping the lower patterns, and wherein, in plan view, ends of the lower patterns are respectively aligned with ends of the upper patterns.

One of the lower patterns may be integrated with the first conductive pattern, wherein one of the upper patterns is integrated with the second conductive pattern.

The peripheral region may include an upper region adjacent to an upper end of the active region, a left region adjacent to a left side of the active region, a lower region adjacent to a lower end of the active region, and a right region adjacent to a right side of the active region, wherein the input-sensing panel further includes sensing pads in the lower region.

In plan view, the third trace lines may extend along the right region and the lower region, and may be connected to the pads.

In plan view, the first trace lines may be connected to the first ends of the second sensing electrodes, may extend along the upper region, the left region, and the lower region, and may be connected to the sensing pads, wherein the second trace lines extend along the lower region, and are connected to the sensing pads.

The first trace lines may include a single layer above the encapsulation substrate.

The first sensing electrodes and the second sensing electrodes at a corner of the active region may be rounded.

The first, second, and third sensing insulating layers may include an inorganic material.

The encapsulation substrate may include glass, wherein the display device further includes a coupling member overlapping the peripheral region, and configured to couple the display panel and the encapsulation substrate.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain aspects of the present disclosure. In the drawings.

DETAILED DESCRIPTION

Figure 1:
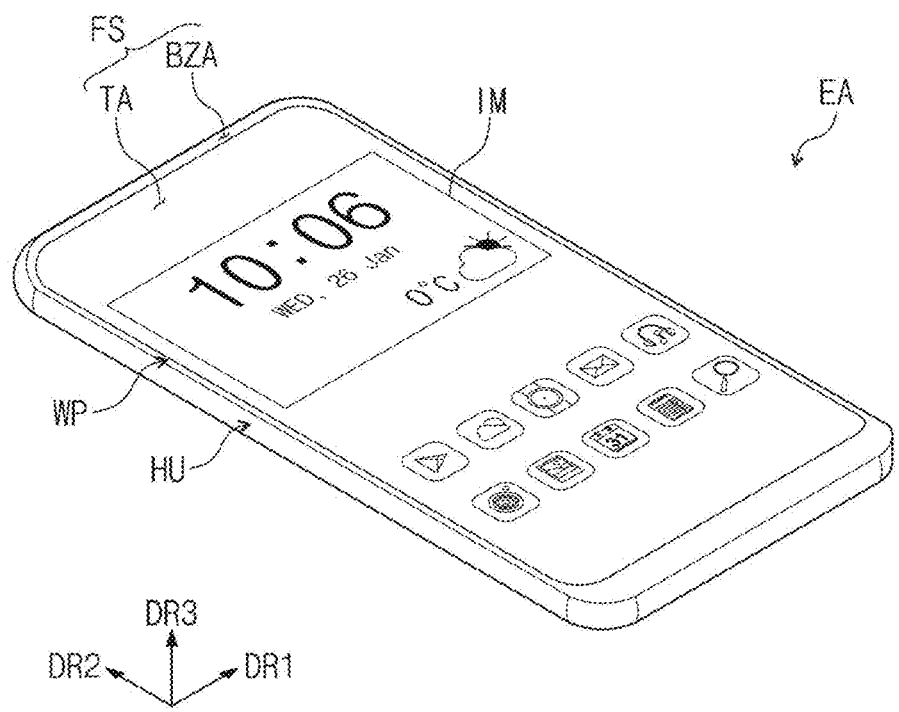
FIG. 1 is an assembled perspective view of a display device according to one or more embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure.

A person of ordinary skill in the art would appreciate, in view of the present disclosure in its entirety, that the present disclosure covers all modifications, equivalents, and replacements within the idea and technical scope of the present disclosure, that each of the features of embodiments of the present disclosure may be combined with each other, in part or in whole, and technically various interlocking and operating are possible, and that each embodiment may be implemented independently of each other, or may be implemented together in an association, unless otherwise stated or implied.

In the drawings, the relative sizes of elements, layers, and regions may be exaggerated for clarity and/or descriptive purposes. In other words, because the sizes and thicknesses of elements in the drawings are arbitrarily illustrated for convenience of description, the disclosure is not limited thereto. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result of, for example, manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Spatially relative terms, such as "beneath," "below," "lower," "lower side," "under," "above," "upper," "over," "higher," "upper side," "side" (e.g., as in "sidewall"), and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a resistor, a capacitor, and/or the like. In describing embodiments, an expression of connection indicates electrical connection unless explicitly described to be direct connection, and "directly connected/directly coupled," or "directly on," refers to one component directly connecting or coupling another component, or being on another component, without an intermediate component.

In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be substantially perpendicular to one another, or may represent different directions that are not perpendicular to one another. The same applies for first, second, and/or third directions.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
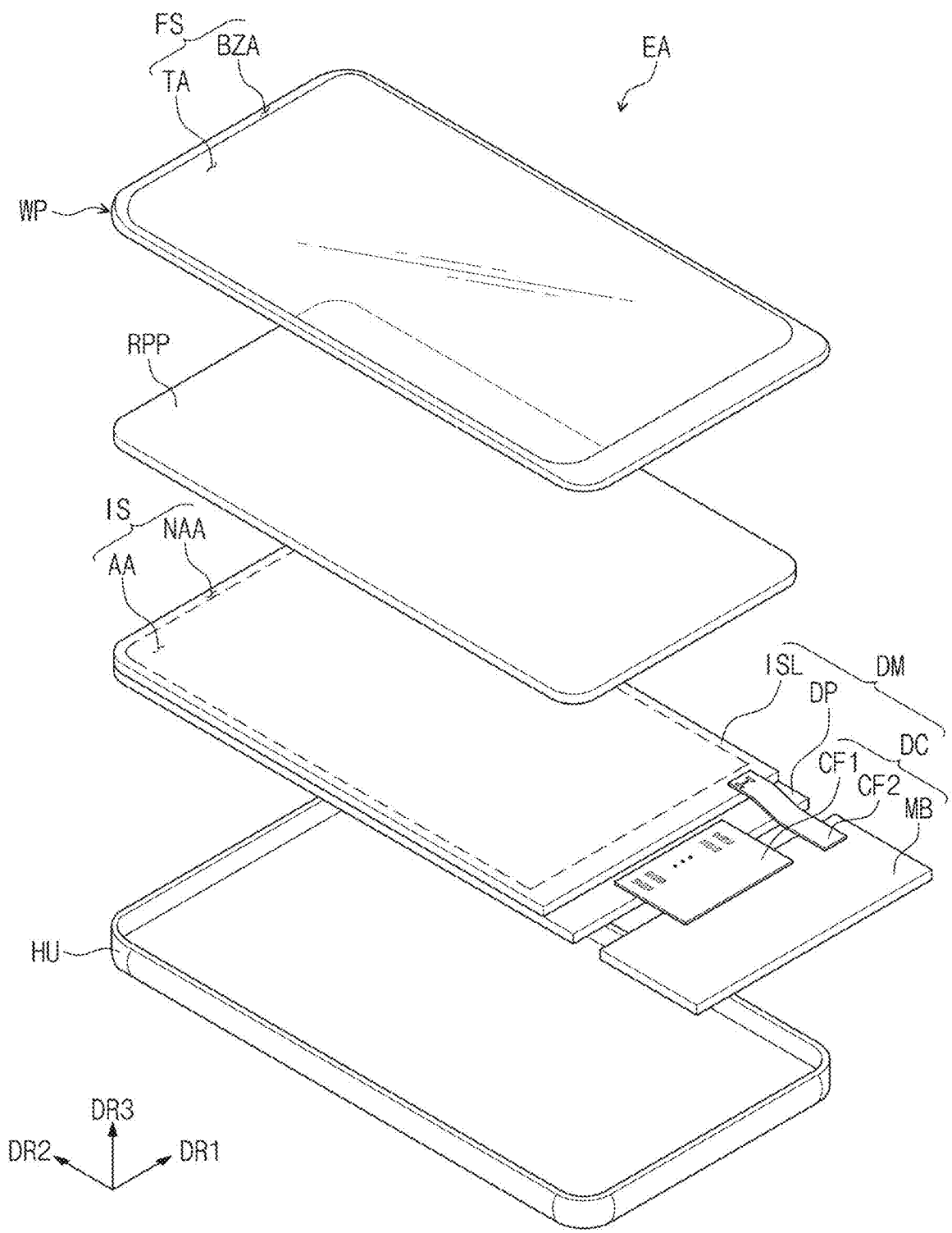
FIG. 2 is an exploded perspective view of a display device according to one or more embodiments of the present disclosure.

FIG. 1 is an assembled perspective view of a display device according to one or more embodiments of the present disclosure. FIG. 2 is an exploded perspective view of a display device according to one or more embodiments of the present disclosure.

Referring to FIGS. 1 and 2, a display device EA may be activated in response to an electrical signal. The display device EA may include various embodiments. For example, the display device EA may be used in a large-sized electronic apparatus, such as a television, a monitor, or an outdoor billboard, as well as a small- or medium-sized electronic apparatus, such as a personal computer, a laptop, a personal digital assistant, a car navigation unit, a game console, a portable electronic device, and a camera. However, these are simply presented as examples, and thus the display device EA may also be employed in other electronic apparatuses without departing from the scope of the present disclosure. A smartphone is illustrated as an example of the display device EA.

The display device EA may display an image IM in a third direction DR3 on a display surface FS that is substantially parallel to each of a first direction DR1 and a second direction DR2. The image IM may include a static image and/or a dynamic image. FIG. 1 illustrates a clock window and icons as one example of the image IM. The display surface FS on which the image IM is displayed may correspond to a front surface of the display device EA, and may correspond to a front surface of a window panel WP.

A front surface (or a front surface) and a rear surface (or a lower surface) of each member are defined on the basis of a direction in which the image IM is displayed. A front surface and a rear surface may be opposed to each other in the third direction DR3, and a normal direction of each of a front surface and a rear surface may be substantially parallel to the third direction DR3. Meanwhile, directions indicated by the first to third directions DR1, DR2, and DR3 may have relative concepts, and may thus be changed into other directions. Hereinafter, first to third directions are directions respectively indicated by the first to third directions DR1, DR2, and DR3 and are denoted as the same reference numerals or symbols. As used herein, the wording "in plan view" may mean being viewed in the third direction DR3.

The display device EA may include the window panel WP, an anti-reflective panel RPP, a display module DM, and a housing HU. The window panel WP and the housing HU are coupled to each other to form an exterior of the display device EA.

The window panel WP may include an optically transparent insulating material. For example, the window panel WP may include glass or plastic. The window panel WP may have a multi-layered structure or a single-layered structure. For example, the window panel WP may include a plurality of plastic films bonded with an adhesive, or a glass substrate and a plastic film bonded with an adhesive.

A front surface FS of the window panel WP defines the front surface of the display device EA as described above. A transmission region TA may be an optically transparent region. For example, the transmission region TA may be a region having a visible light transmittance of about 90% or more.

A bezel region BZA may be a region having a relatively low light transmittance compared to the transmission region TA. The bezel region BZA defines a shape of the transmission region TA. The bezel region BZA may be adjacent to the transmission region TA and surround the transmission region TA.

The bezel region BZA may have a color (e.g., predetermined color). The bezel region BZA may cover a peripheral region NAA of the display module DM, thereby reducing or preventing visibility of components located in the peripheral region NAA. Meanwhile, this is illustrated as an example, and in the window panel WP according to one or more embodiments of the present disclosure, the bezel region BZA may be omitted.

The anti-reflective panel RPP may be located under the window panel WP. The anti-reflective panel RPP reduces a reflectance for external light incident from above the window panel WP. In one or more embodiments of the present disclosure, the anti-reflective panel RPP may be omitted, and may be a component located in the display module DM.

The display module DM may display the image IM, and may sense an external input. The display module DM includes a front surface IS having an active region AA and the peripheral region NAA. The active region AA may be a region activated in response to an electrical signal.

The active region AA may be a region in which pixels PX (see FIG. 4A) are located and the image IM is displayed, and a region in which an external input is sensed at the same time. The transmission region TA overlaps at least the active region AA. For example, the transmission region TA overlaps an entire surface or at least a portion of the active region AA. Thus, a user may view the image IM or provide an external input through the transmission region TA. However, this is illustrated as an example, and in the active region AA, a region in which the image IM is displayed and a region in which an external input is sensed may be separated from each other, and one or more embodiments of the present disclosure is not limited thereto.

The peripheral region NAA may be a region covered with the bezel region BZA. The peripheral region NAA is adjacent to the active region AA. The peripheral region NAA may surround the active region AA (e.g., in plan view). A driving circuit, a driving line, or the like for driving the active region AA may be located in the peripheral region NAA.

The display module DM includes a display panel DP, an input-sensing panel ISL, and a driving circuit DC.

The display panel DP may be a component that substantially generates the image IM. The image IM generated by the display panel DP is viewed by a user from the outside through the transmission region TA.

The input-sensing panel ISL senses an external input applied from the outside. As described above, the input-sensing panel ISL may sense an external input provided to the window panel WP.

The driving circuit DC is electrically connected to the display panel DP and the input-sensing panel ISL. The driving circuit DC includes a main circuit board MB, a first circuit board CF1, and a second circuit board CF2.

The first circuit board CF1 is electrically connected to the display panel DP. The first circuit board CF1 may connect the display panel DP and the main circuit board MB. The first circuit board CF1 is illustrated as a flexible circuit film. However, this is illustrated as an example, and the first circuit board CF1 may not be connected to the main circuit board MB, and the first circuit board CF1 may be a rigid board.

The first circuit board CF1 may be connected to display pads PDD (see FIG. 4A) of the display panel DP located in the peripheral region NAA. The first circuit board CF1 provides an electrical signal for driving the display panel DP to the display panel DP. The electrical signal may be generated from the first circuit board CF1 or from the main circuit board MB.

The second circuit board CF2 is electrically connected to the input-sensing panel ISL. The second circuit board CF2 may connect the input-sensing panel ISL and the main circuit board MB. The second circuit board CF2 is illustrated as a flexible circuit film. However, this is illustrated as an example, and the second circuit board CF2 may not be connected to the main circuit board MB, and the second circuit board CF2 may be a rigid board.

The second circuit board CF2 may be connected to sensing pads PDT (see FIG. 5) of the input-sensing panel ISL located in the peripheral region NAA. The second circuit board CF2 provides an electrical signal for driving the input-sensing panel ISL to the input-sensing panel ISL. The electrical signal may be generated from the second circuit board CF2 or from the main circuit board MB.

The main circuit board MB may include various driving circuits for driving the display module DM, a connector for supplying power, or the like. Each of the first circuit board CF1 and the second circuit board CF2 may be connected to the main circuit board MB. According to the present disclosure, the display module DM may be easily controlled through one main circuit board MB. However, this is illustrated as an example, and in the display module DM according to one or more embodiments of the present disclosure, the display panel DP and the input-sensing panel ISL may be connected to different main circuit boards, and either the first circuit board CF1 or the second circuit board CF2 may not be connected to the main circuit board MB, but one or more embodiments of the present disclosure is not limited thereto.

The housing HU is coupled to the window panel WP. The housing HU is coupled to the window panel WP to provide an inner space (e.g., predetermined inner space). The display module DM may be accommodated in the inner space.

The housing HU may include a material having relatively high rigidity. For example, the housing HU may include a plurality of frames and/or plates including glass, plastic, or metal, or configured with a combination thereof. The housing HU may stably protect components of the display device EA accommodated in the inner space from external impact.

Figure 3A:
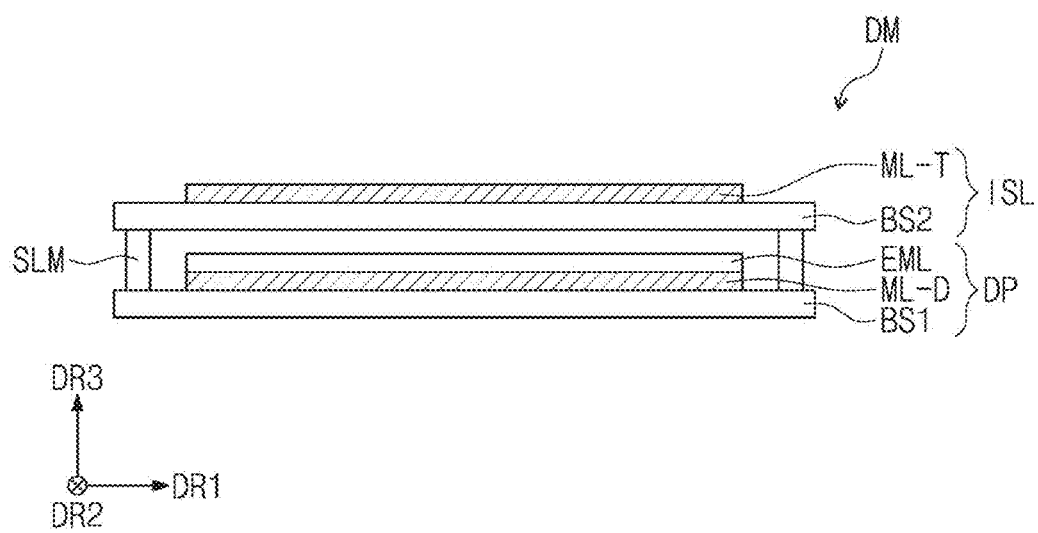
FIG. 3A is a cross-sectional view of a display device according to one or more embodiments of the present disclosure.
Figure 3B:
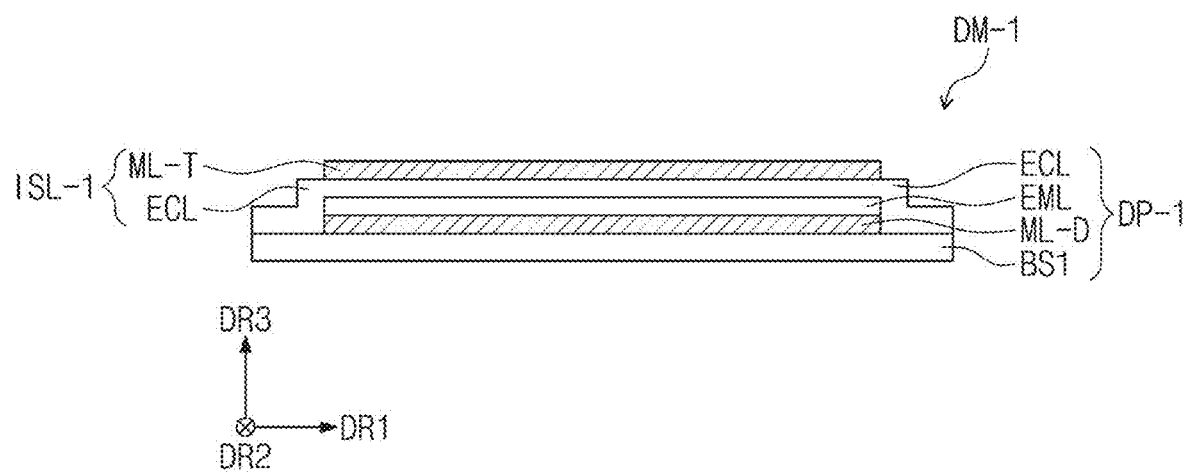
FIG. 3B is a cross-sectional view of a display device according to one or more embodiments of the present disclosure.

FIG. 3A is a cross-sectional view of a display device according to one or more embodiments of the present disclosure. FIG. 3B is a cross-sectional view of a display device according to one or more embodiments of the present disclosure.

Referring to FIG. 3A, a display module DM may include a display panel DP, an input-sensing panel ISL, and a coupling member SLM.

The display panel DP according to one or more embodiments of the present disclosure may be an emissive display panel, and is not particularly limited. For example, the display panel DP may be an organic light-emitting display panel or a quantum dot light-emitting display panel.

The display panel DP may include a first substrate BS1, a display circuit layer ML-D, and an image display layer EML. The input-sensing panel ISL may include a second substrate BS2 (encapsulation substrate) and a sensing circuit layer ML-T.

Each of the first substrate BS1 and the second substrate BS2 may be a stacked structure including a silicon substrate, a plastic substrate, a glass substrate, an insulating film, or a plurality of insulating layers.

The display circuit layer ML-D may be located on the first substrate BS1. The display circuit layer ML-D may include a plurality of insulating layers, a plurality of conductive layers, and a semiconductor layer. The plurality of conductive layers of the display circuit layer ML-D may constitute signal lines or a control circuit of a pixel.

The image display layer EML may be located on the display circuit layer ML-D. The image display layer EML may be a layer that generates light or controls light transmittance. For example, an image display layer EML of an organic light-emitting display panel may include an organic light-emitting material. An image display layer EML of a quantum dot light-emitting display panel may include at least one of a quantum dot or a quantum rod. An image display layer EML of a liquid crystal display panel may include a liquid crystal layer.

The second substrate BS2 may be located on the image display layer EML. Space (e.g., predetermined space) may be defined between the second substrate BS2 and the image display layer EML. The space may be filled with air or inert gas. In addition, in one or more embodiments of the present disclosure, the space may also be filled with a filler, such as a silicon-based polymer, an epoxy-based resin, or an acrylic resin.

The sensing circuit layer ML-T may be located on the second substrate BS2. The sensing circuit layer ML-T may include a plurality of insulating layers and a plurality of conductive layers. The plurality of conductive layers may constitute a sensing electrode for sensing an external input, a sensing line connected to the sensing electrode, and a sensing pad connected to the sensing line.

The coupling member SLM may be located between the first substrate BS1 and the second substrate BS2. The coupling member SLM may couple the first substrate BS1 and the second substrate BS2 to each other. The coupling member SLM may include an organic material, such as a photocurable resin or a photoplastic resin, or include an inorganic material, such as frit seal, and is not particularly limited.

FIG. 3B is a cross-sectional view of a display device according to one or more embodiments of the present disclosure.

Referring to FIG. 3B, a display module DM-1 may include a display panel DP-1 and an input-sensing panel ISL-1. The input-sensing panel ISL-1 may also be referred to as an input-sensing layer.

The display panel DP-1 may include a first substrate BS1, a display circuit layer ML-D, an image display layer EML, and a thin-film encapsulation layer ECL. The input-sensing panel ISL-1 may include a base layer ECL and a sensing circuit layer ML-T. The thin-film encapsulation layer ECL and the base layer ECL may be the same component.

According to one or more embodiments of the present disclosure, the display panel DP-1 and the input-sensing panel ISL-1 may be formed through a continuous process. That is, the sensing circuit layer ML-T may be formed directly on the thin-film encapsulation layer ECL without an additional adhesive layer.

Figure 4A:
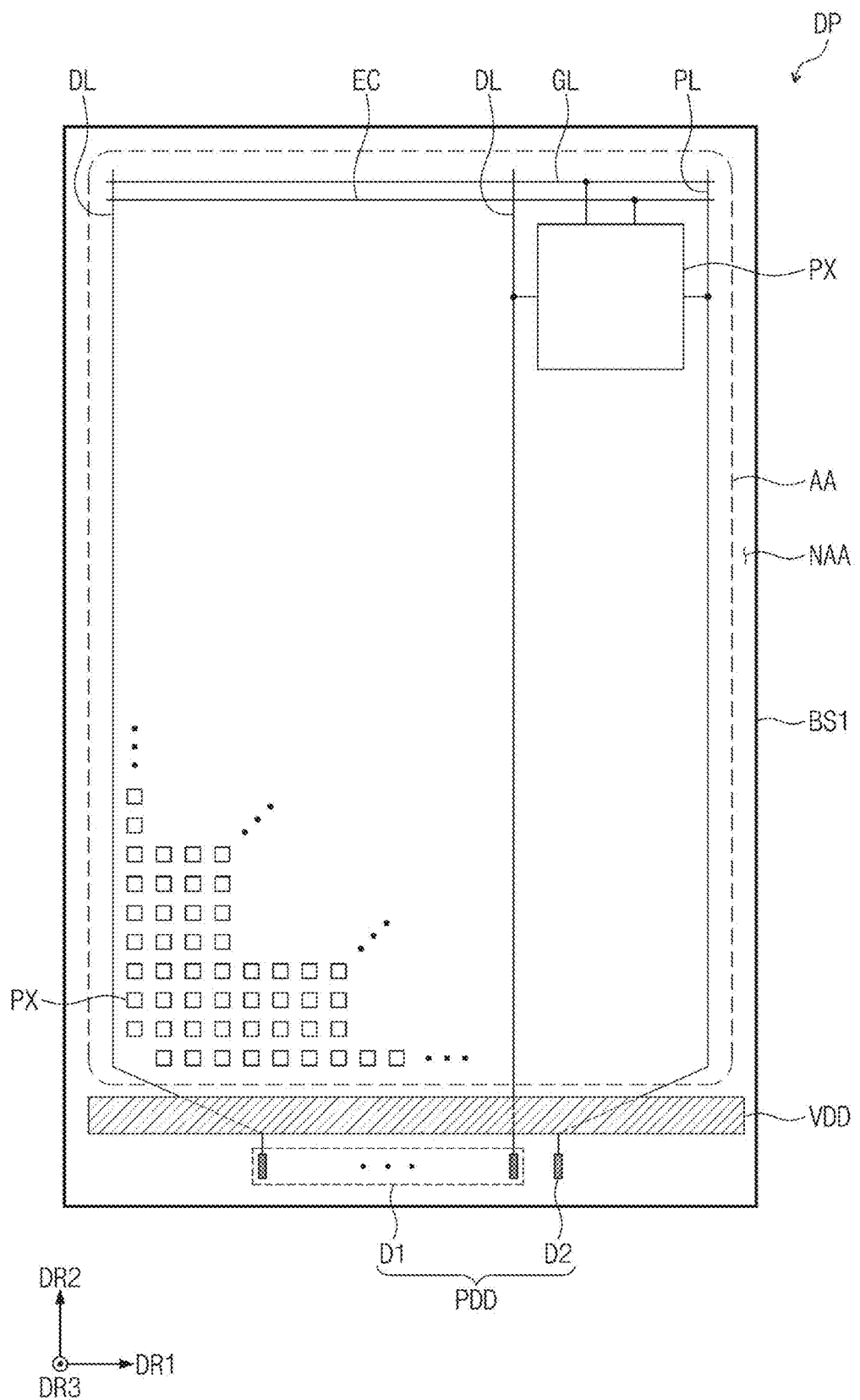
FIG. 4A is a plan view of a display panel according to one or more embodiments of the present disclosure.
Figure 4B:
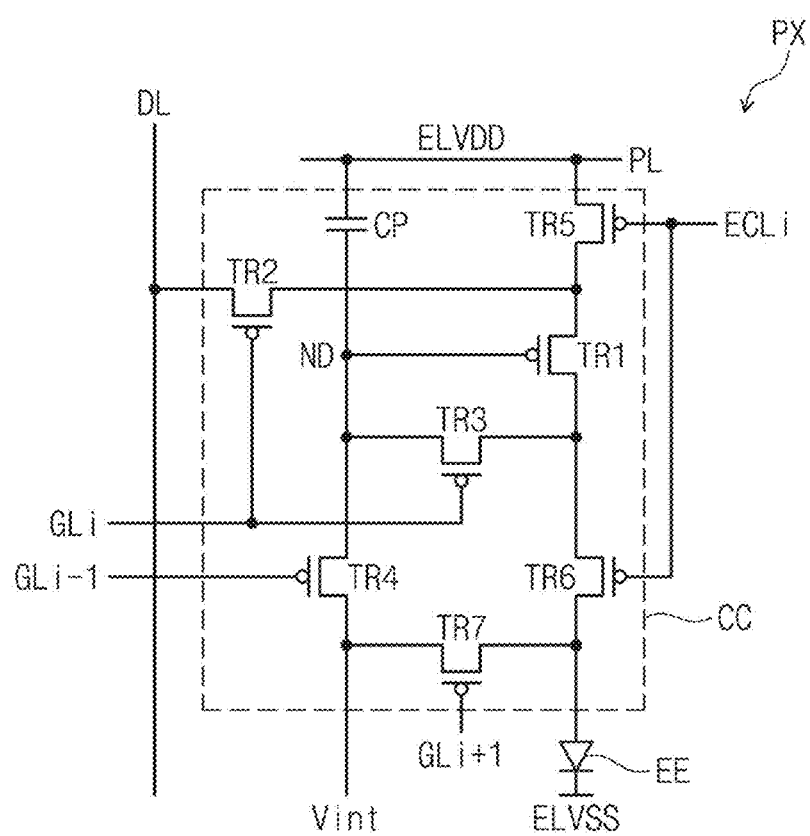
FIG. 4B is an equivalent circuit diagram of a pixel according to one or more embodiments of the present disclosure.

FIG. 4A is a plan view of a display panel according to one or more embodiments of the present disclosure. FIG. 4B is an equivalent circuit diagram of a pixel according to one or more embodiments of the present disclosure.

Referring to FIG. 4A, a display panel DP may include a plurality of pixels PX, a plurality of signal lines GL, DL, PL, and ECL, and a plurality of display pads PDD.

An active region AA of the display panel DP may be a region in which an image is displayed, and a peripheral region NAA may be a region in which a driving circuit, a driving line, or the like is located. FIG. 4A illustrates the active region AA and the peripheral region NAA of the display panel DP. The plurality of pixels PX may be located in the active region AA.

The plurality of signal lines GL, DL, PL, and ECL are connected to the pixels PX, and transmit electrical signals to the pixels PX. Among signal lines included in the display panel DP, a scan line GL, a data line DL, a power line PL, and a light emission control line EC are illustrated. However, this is illustrated as an example, and the signal lines GL, DL, PL, and ECL may further include an initialization voltage line, and are not particularly limited.

FIG. 4B illustrates an enlarged signal circuit diagram of one pixel PX among a plurality of pixels. FIG. 4B illustrates the pixel PX connected to an i-th scan line GLi and an i-th light emission control line ECLi.

The pixel PX may include a light-emitting element EE and a pixel circuit CC. The pixel circuit CC may include a plurality of transistors TR1 to TR7 and a capacitor CP. The plurality of transistors TR1 to TR7 may be formed through a low temperature polycrystalline silicon (LTPS) process or a low temperature polycrystalline oxide (LTPO) process.

The pixel circuit CC controls the amount of current flowing through the light-emitting element EE according to a data signal. The light-emitting element EE may emit light having luminance (e.g., predetermined luminance) according to the amount of current provided from the pixel circuit CC. To this end, a level of first power ELVDD may be set to be higher than a level of second power ELVSS. The light-emitting element EE may include an organic light-emitting element or a quantum dot light-emitting element.

Each of the plurality of transistors TR1 to TR7 may include an input electrode (or, a source electrode), an output electrode (or, a drain electrode), and a control electrode (or, a gate electrode). In this specification, for convenience, either the input electrode or the output electrode may be referred to as a first electrode, and the other may be referred to as a second electrode.

A first electrode of a first transistor TR1 is connected to the first power ELVDD via a fifth transistor TR5, and a second electrode of the first transistor TR1 is connected to an anode electrode of the light-emitting element EE via a sixth transistor TR6. In this specification, the first transistor TR1 may be referred to as a driving transistor.

The first transistor TR1 controls the amount of current flowing through the light-emitting element EE according to a voltage applied to a control electrode of the first transistor TR1.

A second transistor TR2 is connected between a data line DL and the first electrode of the first transistor TR1. Furthermore, a control electrode of the second transistor TR2 is connected to the i-th scan line GLi. The second transistor TR2 is turned on when an i-th scan signal is provided to the i-th scan line GLi, and electrically connects the data line DL and the first electrode of the first transistor TR1.

A third transistor TR3 is connected between the second electrode of the first transistor TR1 and the control electrode of the first transistor TR1. A control electrode of the third transistor TR3 is connected to the i-th scan line GLi. The third transistor TR3 is turned on when the i-th scan signal is provided to the i-th scan line GLi, and electrically connects the second electrode of the first transistor TR1 and the control electrode of the first transistor TR1. Thus, when the third transistor TR3 is turned on, the first transistor TR1 is diode-connected.

In one or more embodiments, a fourth transistor TR4 is connected between a node ND and an initialization power generator. Furthermore, a control electrode of the fourth transistor TR4 is connected to an (i−1)-th scan line GLi−1. The fourth transistor TR4 is turned on when an (i−1)-th scan signal is provided to the (i−1)-th scan line GLi−1, and provides an initialization voltage Vint to the node ND.

The fifth transistor TR5 is connected between a power line PL and the first electrode of the first transistor TR1. A control electrode of the fifth transistor TR5 is connected to the i-th light emission control line ECLi.

The sixth transistor TR6 is connected between the second electrode of the first transistor TR1 and the anode electrode of the light-emitting element EE. Furthermore, a control electrode of the sixth transistor TR6 is connected to the i-th light emission control line ECLi.

In one or more embodiments, a seventh transistor TR7 is connected between an initialization power generator and the anode electrode of the light-emitting element EE. Furthermore, a control electrode of the seventh transistor TR7 is connected to an (i+1)-th scan line GLi+1. Such a seventh transistor TR7 is turned on when an (i+1)-th scan signal is provided to the (i+1)-th scan line GLi+1, and provides the initial voltage Vint to the anode electrode of the light-emitting element EE.

The seventh transistor TR7 may improve a black color expression capability of the pixel PX. For example, in one or more embodiments, when the seventh transistor TR7 is turned on, a parasitic capacitor of the light-emitting element EE is discharged. Then, when implementing black luminance, the light-emitting element EE does not emit light due to leakage current from the first transistor TR1, thereby improving a black color expression capability.

Additionally, FIG. 4B illustrates that the control electrode of the seventh transistor TR7 is connected to the (i+1)-th scan line GLi+1, but one or more embodiments of the present disclosure is not limited thereto. In one or more other embodiments of the present disclosure, the control electrode of the seventh transistor TR7 may be connected to the i-th scan line GLi or the (i−1)-th scan line GLi−1.

The capacitor CP is located between the power line PL and the node ND. The capacitor CP stores a voltage in accordance with a data signal. According to a voltage stored in the capacitor CP, the amount of current flowing through the first transistor TR1 when the fifth transistor TR5 and the sixth transistor TR6 are turned on may be determined.

In the present disclosure, an equivalent circuit of the pixel PX is not limited to the equivalent circuit illustrated in FIG. 4B. In one or more other embodiments of the present disclosure, the pixel PX may be implemented in various forms to allow the light-emitting element EE to emit light. Illustration of FIG. 4B is based on a PMOS, but one or more embodiments of the present disclosure is not limited thereto. In one or more other embodiments of the present disclosure, the pixel circuit CC may be configured with an NMOS. In yet one or more other embodiments of the present disclosure, the pixel circuit CC may be configured with a combination of an NMOS and a PMOS.

Referring back to FIG. 4A, a power pattern VDD is located in the peripheral region NAA. The power pattern VDD is connected to a plurality of power lines PL. Thus, because the display panel DP includes the power pattern VDD, the display panel DP may provide the same first power signal to the plurality of pixels.

The display pads PDD may include a first pad D1 and a second pad D2. The first pad D1 may be provided in a plurality of first pads respectively connected to data lines DL. The second pad D2 may be connected to the power pattern VDD and electrically connected to the power line PL. The display panel DP may provide electrical signals provided from the outside to the pixels PX through the display pads PDD. Meanwhile, the display pads PDD may further include pads for receiving other electrical signals in addition to the first pad D1 and the second pad D2, and are not particularly limited.

Figure 5:
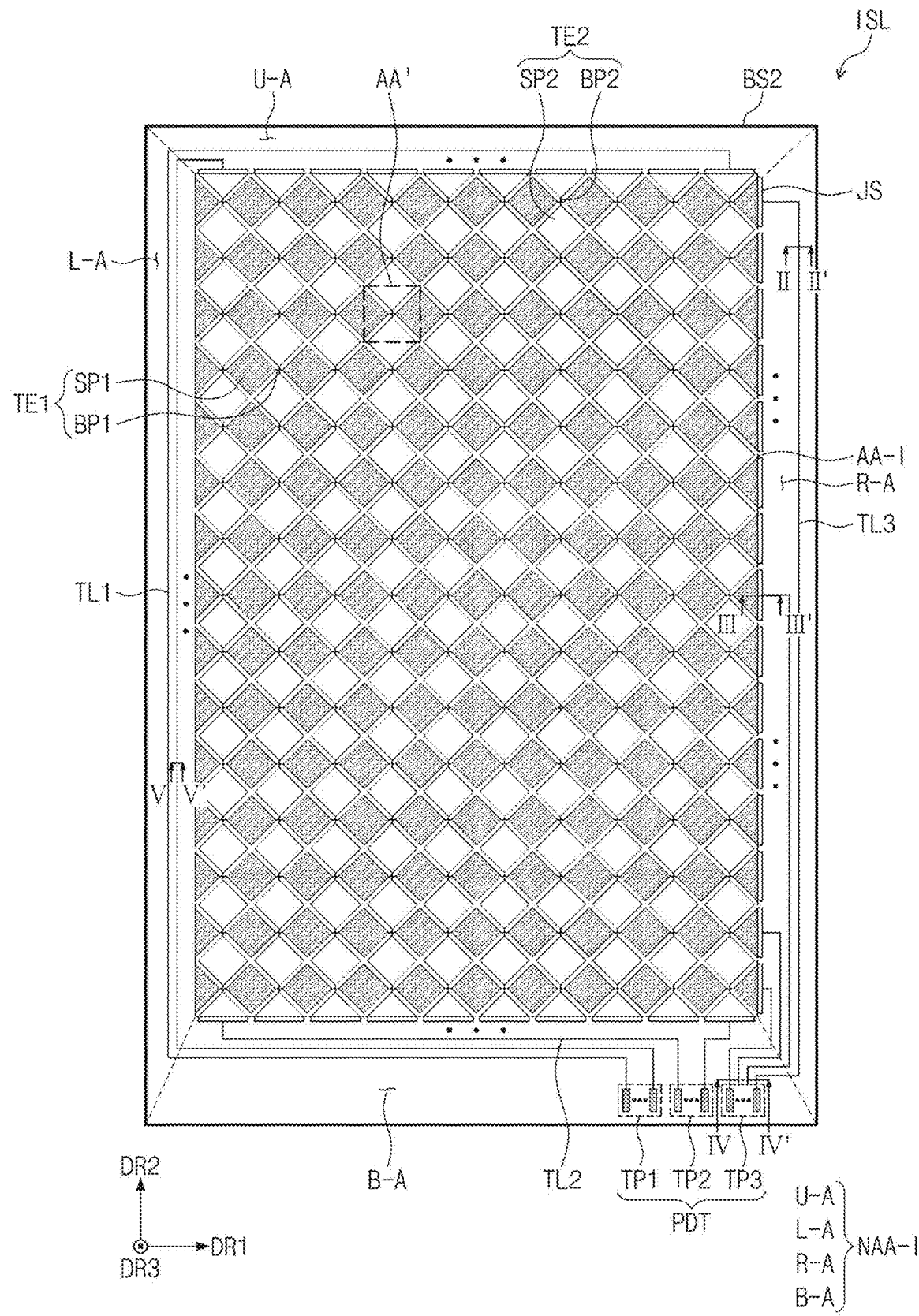
FIG. 5 is a plan view of an input-sensing panel according to one or more embodiments of the present disclosure.
Figure 6:
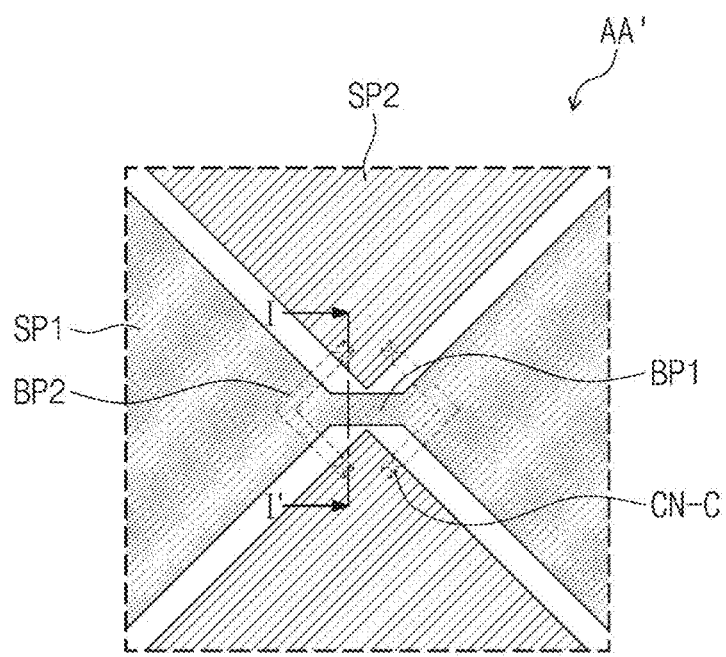
FIG. 6 is an enlarged plan view illustrating a region AA' of FIG. 5.
Figure 7:
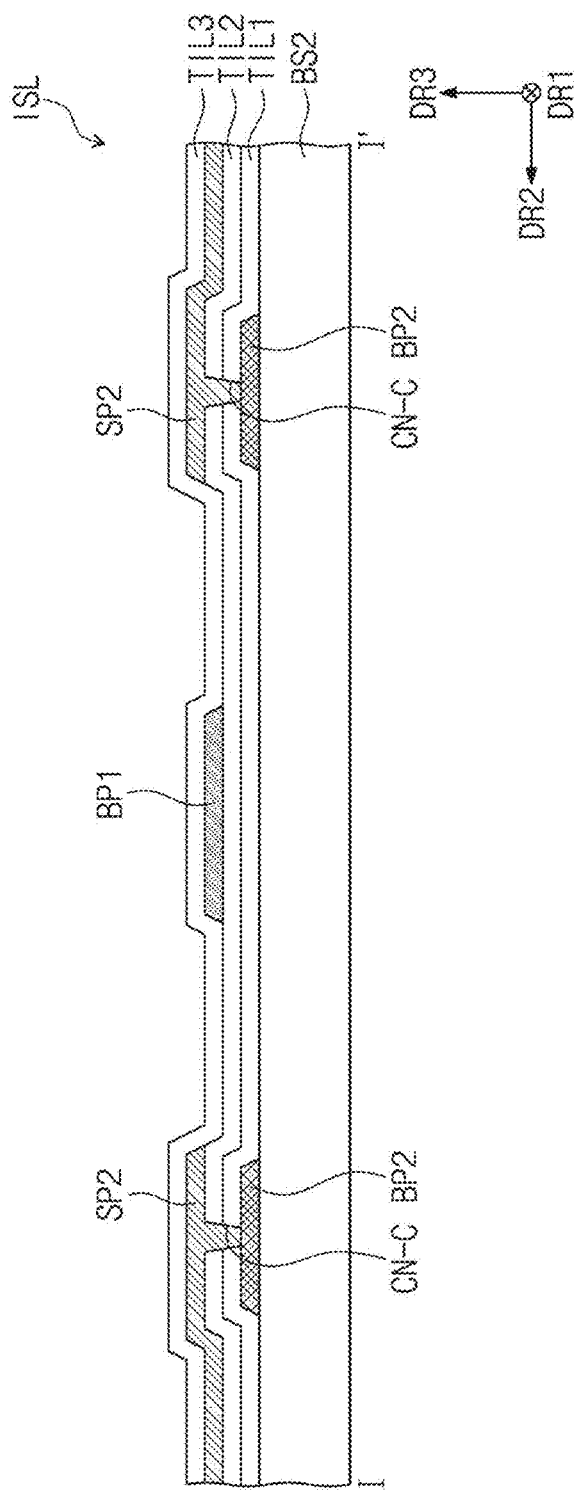
FIG. 7 is a cross-sectional view taken along the line I-I' of FIG. 6.

FIG. 5 is a plan view of an input-sensing panel according to one or more embodiments of the present disclosure. FIG. 6 is an enlarged plan view illustrating a region AA' of FIG. 5. FIG. 7 is a cross-sectional view taken along the line I-I' of FIG. 6. Hereinafter, description will be made on the basis of the input-sensing panel ISL illustrated in FIG. 3A, but description made below may also be applied to the input-sensing panel ISL-1 illustrated in FIG. 3B.

Referring to FIG. 5, the input-sensing panel ISL includes the second substrate BS2, first sensing electrodes TE1, second sensing electrodes TE2, first to third trace lines TL1, TL2, and TL3, and a plurality of sensing pads PDT. The first sensing electrodes TE1, the second sensing electrodes TE2, the plurality of trace lines TL1, TL2, and TL3, and the plurality of sensing pads PDT may constitute the sensing circuit layer ML-T (see FIG. 3A).

An active region AA-I and a peripheral region NAA-I may be defined in the second substrate BS2. The peripheral region NAA-I may surround the active region AA-I (e.g., in plan view).

The first sensing electrodes TE1 and the second sensing electrodes TE2 may be located in the active region AA-I. The input-sensing panel ISL may acquire information about an external input through a change in capacitance between the first sensing electrodes TE1 and the second sensing electrodes TE2.

The first sensing electrodes TE1 may extend along a first direction DR1, and may be arranged along a second direction DR2. The first sensing electrodes TE1 may each include first sensing patterns SP1 and first connection patterns BP1 arranged along the first direction DR1. At least one first connection pattern BP1 may be connected to two first sensing patterns SP1 adjacent to each other along the first direction DR1. The first sensing patterns SP1 and the first connection patterns BP1 are substantially provided as a whole or single pattern, but will be divided for convenience of description.

The second sensing electrodes TE2 may extend along the second direction DR2, and may be arranged along the first direction DR1. The second sensing electrodes TE2 may each include second sensing patterns SP2 and second connection patterns BP2 arranged along the second direction DR2. At least one second connection pattern BP2 may be connected to two second sensing patterns SP2 adjacent to each other along the second direction DR2. According to the present disclosure, the second sensing patterns SP2 and the second connection pattern BP2 may be respectively located on different layers.

Referring to FIGS. 6 and 7, the first sensing patterns SP1, and the first connection pattern BP1 located between the first sensing patterns SP1, may be substantially provided as one pattern. The second sensing patterns SP2 may be spaced apart from each other along the second direction DR2. The first connection pattern BP1 may be located between the second sensing patterns SP2. The second sensing patterns SP2 spaced apart from each other may be connected to each other by the second connection patterns BP2. The second connection patterns BP2 and the second sensing patterns SP2 may be respectively located on different layers, and the second sensing patterns SP2 may be connected to the second connection patterns BP2 through a connection contact hole CN-C.

As illustrated in FIG. 7, the input-sensing panel ISL according to the present disclosure may include a first sensing insulating layer TIL1 located on the second substrate BS2 (encapsulation substrate), a second sensing insulating layer TIL2, and a third sensing insulating layer TIL3.

The first sensing patterns SP1, the first connection pattern BP1, and the second sensing patterns SP2 may be located on the second sensing insulating layer TIL2, and may be covered with the third sensing insulating layer TIL3. The second connection patterns BP2 may be located on the second substrate BS2 (encapsulation substrate), and may be covered with the first sensing insulating layer TIL1.

The second sensing patterns SP2 may be connected to the second connection patterns BP2 through the connection contact hole CN-C defined in the first and second sensing insulating layers TIL1 and TIL2.

According to the present disclosure, the first sensing insulating layer TIL1, the second sensing insulating layer TIL2, and the third sensing insulating layer TIL3 may each include a silicon-based inorganic material. The first sensing patterns SP1, the first connection pattern BP1, and the second sensing patterns SP2 located on the second sensing insulating layer TIL2 may be defined as being included in a third conductive layer, and the third conductive layer in the present disclosure may include a transparent conductive oxide. The second connection patterns BP2 located on the second substrate BS2 may be defined as a first conductive layer, and the first conductive layer may include molybdenum-based metal. A second conductive layer located on the first sensing insulating layer TIL1 may be omitted in the first and second sensing electrodes TE1 and TE2. Conductive patterns included in the second conductive layer may constitute a portion of the trace lines TL1, TL2, and TL3, and description thereof will be made later.

The trace lines TL1, TL2, and TL3 are located in the peripheral region NAA-I. The trace lines TL1, TL2, and TL3 may include a first trace line TL1, a second trace line TL2, and a third trace line TL3.

According to the present disclosure, the peripheral region NAA-I may be divided into an upper region U-A adjacent to an upper side of the active region AA-I, a left region L-A adjacent to a left side of the active region AA-I, a right region R-A adjacent to a right side of the active region AA-I, and a lower region B-A adjacent to a lower side of the active region AA-I.

The first trace line TL1 is connected to one end (e.g., a first end) of the second sensing electrode TE2. The one end of the second sensing electrode TE2 may be adjacent to a boundary between the active region AA-I and the upper region U-A.

First trace lines TL1 may be respectively connected to one ends of the second sensing electrodes TE2, may extend along the upper region U-A, the left region L-A, and the lower region B-A, and may be connected to first sensing pads TP1.

The second trace line TL2 is connected to another end (e.g., a second end) of the second sensing electrode TE2. Another end of the second sensing electrode TE2 may be adjacent to a boundary between the active region AA-I and the lower region B-A.

Second trace lines TL2 may be respectively connected to other ends of the second sensing electrodes TE2, may extend along the lower region B-A, and may be connected to second sensing pads TP2.

The third trace line TL3 is connected to one end (e.g., a first end) of the first sensing electrode TE1. The one end of the first sensing electrode TE1 may be adjacent to a boundary between the active region AA-I and the right region R-A.

Third trace lines TL3 may be connected to one ends of the first sensing electrodes TE1, may extend along the right region R-A and the lower region B-A, and may be connected to third sensing pads TP3.

According to the present disclosure, one second sensing electrode TE2 may be connected to two trace lines that are the first trace line TL1 and the second trace line TL2. Thus, sensitivity according to a region with respect to the second sensing electrode TE2 having a relatively great length compared to the first sensing electrode TE1 may be uniformly maintained. Meanwhile, this is illustrated as an example, and the first trace line TL1 may be omitted, and is not particularly limited.

The sensing pads PDT are located in the peripheral region NAA-I. The sensing pads PDT may include the first sensing pad TP1, the second sensing pad TP2, and the third sensing pad TP3. The first sensing pad TP1 is connected to the first trace line TL1, and is electrically connected to the second sensing electrode TE2. The second sensing pad TP2 is connected to the second trace line TL2 and electrically connected to the second sensing electrode TE2. The third sensing pad TP3 is connected to the third trace line TL3 and electrically connected to the first sensing electrode TE1.

The input-sensing panel ISL according to one or more embodiments may further include junction patterns JS. The junction patterns JS may be located in a region in which the trace lines TL1, TL2, and TL3 and the sensing electrodes TE1 and TE2 are connected to each other. Thus, the junction patterns JS may be located along a boundary between the upper region U-A and the active region AA-I, a boundary between the right region R-A and the active region AA-I, and a boundary between the lower region B-A and the active region AA-I. FIG. 5 illustrates that the junction patterns JS are located in the peripheral region NAA-I, but one or more embodiments of the present disclosure is not limited thereto, and the junction patterns JS may be located in the active region AA-I.

Figure 8:
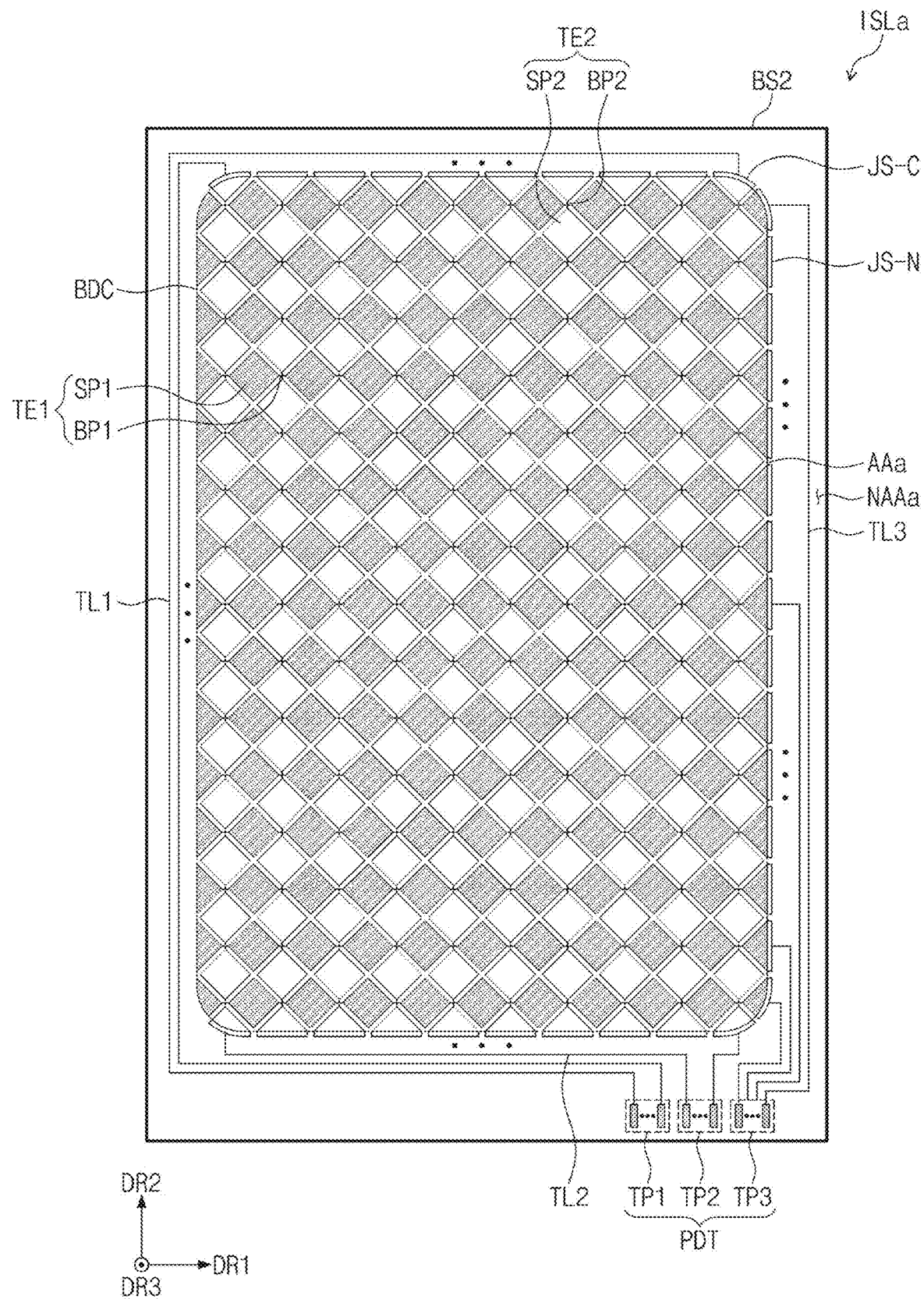
FIG. 8 is a plan view of an input-sensing panel according to one or more embodiments of the present disclosure.

FIG. 8 is a plan view of an input-sensing panel according to one or more embodiments of the present disclosure. In describing with reference to FIG. 8, a difference from FIG. 5 will be described.

Referring to FIG. 8, an active region AAa and a peripheral region NAAa may be defined in a second substrate BS2 of an input-sensing panel ISLa. The peripheral region NAAa may surround the active region AAa.

Because the input-sensing panel ISL described with reference to FIG. 5 may have the active region AA-I having a quadrangular shape, a boundary between the active region AA-I and the peripheral region NAA-I may be a straight line. Accordingly, corners of the active region AA-I may each have a right-angled shape. However, the active region AAa illustrated in FIG. 8 has a shape in which a line adjacent to a vertex of a quadrangle has curvature. Accordingly, a portion of a boundary BDC between the active region AAa and the peripheral region NAAa may include a curved region.

Thus, among sensing patterns included in a first sensing electrode TE1 and a second sensing electrode TE2, sensing patterns adjacent to a corner may have a shape that is cut to correspond to the curvature.

The input-sensing panel ISLa may include normal junction patterns JS-N and curved junction patterns JS-C. The curved junction patterns JS-C may be adjacent to the sensing patterns located at corners of the active region AAa having curvature, and the normal junction patterns JS-N may be connected to the other sensing patterns.

Figure 9:
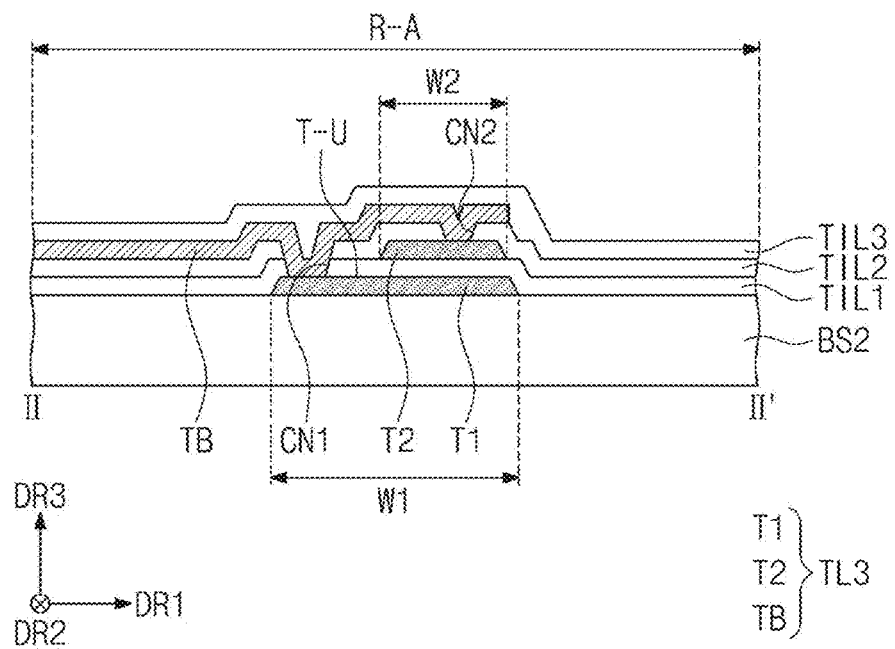
FIG. 9 is a cross-sectional view taken along the line II-II' of FIG. 5.
Figure 10:
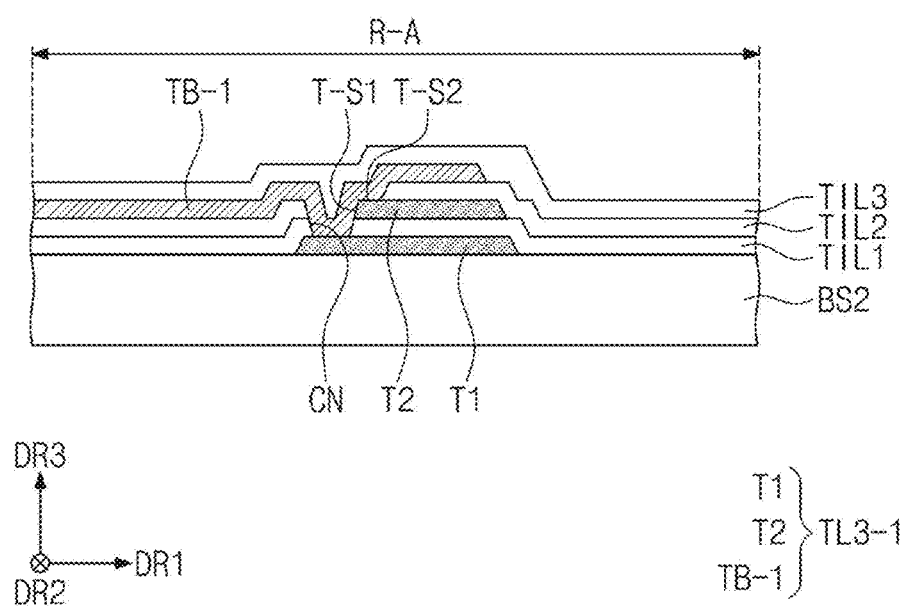
FIG. 10 is a cross-sectional view of a trace line according to one or more embodiments of the present disclosure.

FIG. 9 is a cross-sectional view taken along the line II-II' of FIG. 5. FIG. 10 is a cross-sectional view of a trace line according to one or more embodiments of the present disclosure.

FIG. 9 illustrates a cross-sectional view of one third trace line TL3 described with reference to FIG. 5. The following description of the third trace line TL3 provided with reference to FIG. 9 may be applied in common to third trace lines TL3 respectively connected to one ends of the first sensing electrodes TE2 and located in the right region R-A in the peripheral region NAA-I of FIG. 5.

The third trace line TL3 may include a first conductive pattern T1, a second conductive pattern T2, and a bridge pattern TB. The first conductive pattern T1 included in the first conductive layer, and the second conductive pattern T2 included in the second conductive layer, may include molybdenum-based metal, and the bridge pattern TB included in the third conductive layer may include a transparent conductive oxide.

The first conductive pattern T1 may be located on the second substrate BS2 (encapsulation substrate), and may be covered with the first sensing insulating layer TIL1.

The second conductive pattern T2 may be located on the first sensing insulating layer TIL1, and may be covered with the second sensing insulating layer TIL2. The second conductive pattern T2 may overlap the first conductive pattern T1. In a first direction DR1, a first width W1 of the first conductive pattern T1 may be greater than a second width W2 of the second conductive pattern T2. Thus, in plan view, a portion T-U of an upper surface of the first conductive pattern T1 may be exposed from the second conductive pattern T2.

The bridge pattern TB may be located on the second sensing insulating layer TIL2, and may be covered with the third sensing insulating layer TIL3. The bridge pattern TB may be branched off from the first sensing pattern SP1 to the right region R-A. Thus, the first sensing pattern SP1 and the bridge pattern TB may be patterned through the same process and may include the same material.

According to the present disclosure, the bridge pattern TB may be connected to the first conductive pattern T1 and the second conductive pattern T2. The bridge pattern TB may be connected to the portion T-U of the first conductive pattern T1 exposed from the second conductive pattern T2 through a first contact hole CN1 defined by the first sensing insulating layer TIL1 and the second sensing insulating layer TIL2. In addition, the bridge pattern TB may be connected to the second conductive pattern T2 through a second contact hole CN2 defined by the second sensing insulating layer TIL2.

According to one or more embodiments, the second conductive pattern T2 may be directly connected to the first conductive pattern T1 through contact holes passing through the first sensing insulating layer TIL1.

According to the present disclosure, the third trace lines TL3 located in the right region R-A, in which the trace lines are densely located, may include metal layers stacked in two layers, and resistance of the third trace lines TL3 may thus be reduced. In addition, because the second conductive pattern T2 may expose the portion T-U of the first conductive pattern T1, and the bridge pattern TB may be connected to the exposed portion T-U, space of the peripheral region NAA-I (see FIG. 5) for the third trace lines TL3 to be located in may be reduced. Accordingly, the display device EA (see FIG. 2) including the input-sensing panel ISL having reduced dead space may be provided.

Referring to FIG. 10, a third trace line TL3-1 may include a first conductive pattern T1, a second conductive pattern T2, and a bridge pattern TB-1.

The first conductive pattern T1 may be located on a second substrate BS2 (encapsulation substrate), and may be covered with a first sensing insulating layer TIL1.

The second conductive pattern T2 may be located on the first sensing insulating layer TIL1, and may be covered with a second sensing insulating layer TIL2. The second conductive pattern T2 may overlap the first conductive pattern T1. In plan view, a portion of an upper surface of the first conductive pattern T1 may be exposed from the second conductive pattern T2.

The bridge pattern TB-1 may be located on the second sensing insulating layer TIL2, and may be covered with a third sensing insulating layer TIL3. The bridge pattern TB-1 may be branched off from a first sensing pattern SP1 to a right region R-A. Thus, the first sensing pattern SP1 and the bridge pattern TB-1 may be patterned through the same process and may include the same material.

According to the present disclosure, the bridge pattern TB-1 may be connected to the first conductive pattern T1 and the second conductive pattern T2. The bridge pattern TB-1 may be connected to the first conductive pattern T1 and the second conductive pattern T2 through a contact hole CN defined by the first sensing insulating layer TIL1 and the second sensing insulating layer TIL2.

The contact hole CN may expose a portion T-U of the first conductive pattern T1, a side surface T-S1 of the second conductive pattern T2, and an upper surface T-S2 of the second conductive pattern T2.

The bridge pattern TB-1 may be located in the contact hole CN and in contact with the portion T-U of the first conductive pattern T1, the side surface T-S1 of the second conductive pattern T2, and the upper surface T-S2 of the second conductive pattern T2. Thus, unlike what is illustrated in FIG. 9, a process of forming the second contact hole CN2 (see FIG. 9) in the second sensing insulating layer TIL2 to separately connect the second conductive pattern T2 and the bridge pattern TB-1 may be skipped.

Figure 11:
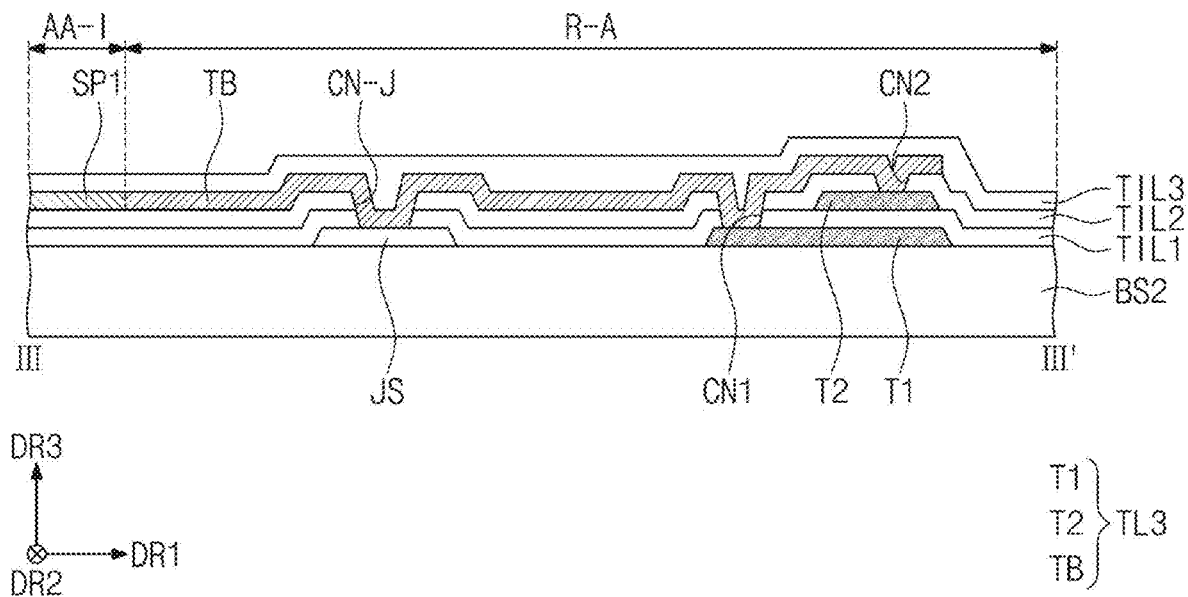
FIG. 11 is a cross-sectional view taken along the line III-III' of FIG. 5.
Figure 12:
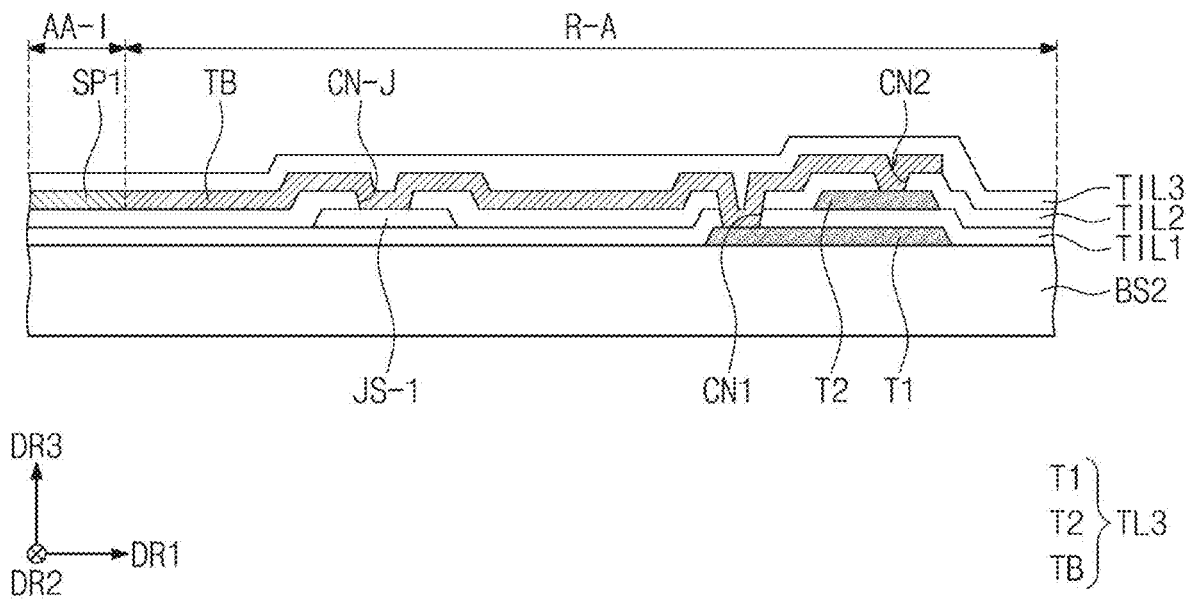
FIG. 12 is a cross-sectional view of a trace line according to one or more embodiments of the present disclosure.

FIG. 11 is a cross-sectional view taken along the line III-III' of FIG. 5. FIG. 12 is a cross-sectional view of a trace line according to one or more embodiments of the present disclosure. FIG. 11 illustrates connection relationship of the third trace line TL3 and the junction pattern JS described with reference to FIG. 5.

Referring to FIG. 11, the third trace line TL3 may include a first conductive pattern T1, a second conductive pattern T2, and a bridge pattern TB.

The first conductive pattern T1 may be located on the second substrate BS2 (encapsulation substrate), and may be covered with the first sensing insulating layer TIL1.

The second conductive pattern T2 may be located on the first sensing insulating layer TIL1, and may be covered with the second sensing insulating layer TIL2. The second conductive pattern T2 may overlap the first conductive pattern T1. In plan view, a portion of an upper surface of the first conductive pattern T1 may be exposed from the second conductive pattern T2.

The bridge pattern TB may be located on the second sensing insulating layer TIL2, and may be covered with the third sensing insulating layer TIL3. The bridge pattern TB may be branched off from the first sensing pattern SP1 to the right region R-A. Thus, the first sensing pattern SP1 and the bridge pattern TB may be patterned through the same process and may include the same material.

The bridge pattern TB may be connected to the first conductive pattern T1 and the second conductive pattern T2 through first and second contact holes CN1 and CN2.

According to one or more embodiments, the junction pattern JS may be included in the first conductive layer. Accordingly, the junction pattern JS may be located on the second substrate BS2 (encapsulation substrate), and may be covered with the first sensing insulating layer TIL1. The junction pattern JS may be spaced apart from the first conductive pattern T1 along a first direction DR1. FIG. 11 illustrates that the junction pattern JS is located in the right region R-A, but one or more embodiments of the present disclosure is not limited thereto. The junction pattern JS may be located in the active region AA-I, or may be located to overlap a boundary between the active region AA-I and the right region R-A.

The bridge pattern TB may be connected to the junction pattern JS. The bridge pattern TB may be connected to the junction pattern JS through a junction contact hole CN-J defined by the first sensing insulating layer TIL1 and the second sensing insulating layer TIL2.

The following descriptions provided with reference to FIG. 12 are mainly focused on differences from FIG. 11. A junction pattern JS-1 according to one or more embodiments may be included in a second conductive layer. Accordingly, the junction pattern JS-1 may be located on a first sensing insulating layer TIL1, and may be covered with a second sensing insulating layer TIL2.

A bridge pattern TB may be connected to the junction pattern JS-1. The bridge pattern TB may be connected to the junction pattern JS-1 through a junction contact hole CN-J defined by the second sensing insulating layer TIL2.

Figure 13:
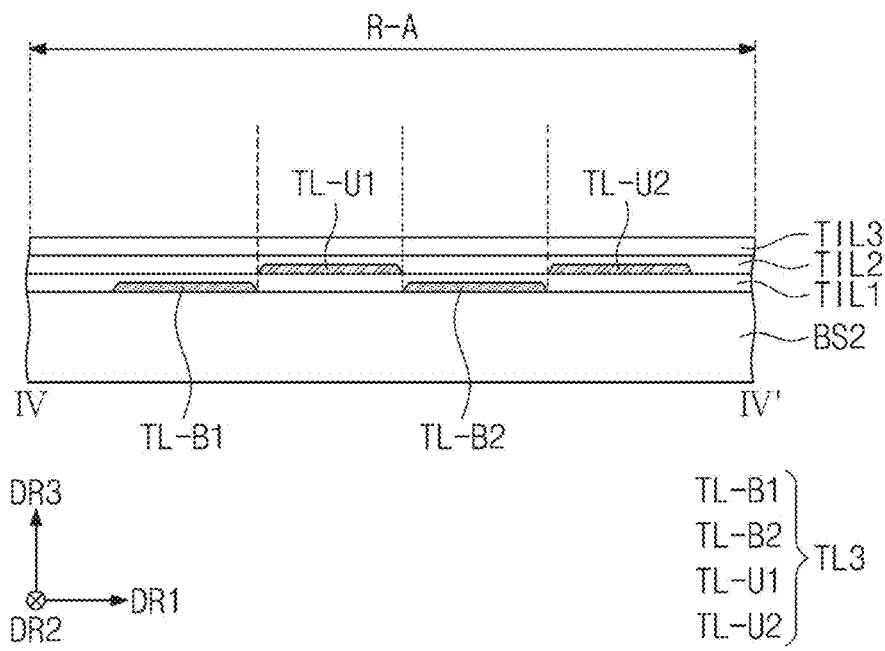
FIG. 13 is a cross-sectional view taken along the line IV-IV' of FIG. 5.

FIG. 13 is a cross-sectional view taken along the line IV-IV' of FIG. 5. FIG. 13 is a cross-sectional view related to the third trace lines TL3 located in the lower region B-A among the third trace lines TL3 described with reference to FIG. 5.

The lower region B-A may be a region in which the first to third trace lines TL1, TL2, and TL3 are densely located so as to be connected to the sensing pads PDT as described with reference to FIG. 5. Thus, to reduce or prevent the likelihood of a short-circuit defect and an increase in dead space, the third trace lines TL3 located in the lower region B-A may include a single-layered metal layer.

A portion of the third trace lines TL3 adjacent to the other ends of the second sensing electrodes TE2 described with reference to FIG. 5, that is the third trace lines TL3 located in the lower region B-A, may include lower patterns TL-B1 and TL-B2, and a remaining portion of the third trace lines TL3 may include upper patterns TL-U1 and TL-U2. It is illustrated that each of the number of the lower patterns TL-B1 and TL-B2 and the number of the upper patterns TL-U1 and TL-U2 is two, but one or more embodiments of the present disclosure is not limited thereto.

The lower patterns TL-B1 and TL-B2 may be located on the second substrate BS2 (encapsulation substrate), and may be covered with the first sensing insulating layer TIL1. The lower patterns TL-B1 and TL-B2 may be spaced apart from each other along a first direction DR1. The upper patterns TL-U1 and TL-U2 may be located on the first sensing insulating layer TIL1, and may be covered with the second sensing insulating layer TIL2. The upper patterns TL-U1 and TL-U2 may be spaced apart from each other along the first direction DR1.

In plan view, the lower patterns TL-B1 and TL-B2 and the upper patterns TL-U1 and TL-U2 may not overlap each other. In addition, in plan view, the lower patterns TL-B1 and TL-B2 and the upper patterns TL-U1 and TL-U2 may be alternately arranged along the first direction DR1. Ends of the lower patterns TL-B1 and TL-B2 may be respectively aligned with ends of the upper patterns TL-U1 and TL-U2 along a third direction DR3.

The lower patterns TL-B1 and TL-B2 and the upper patterns TI-U1 and TL-U2 may be respectively connected to the third trace lines TL3 different from each other. Accordingly, the lower patterns TL-B1 and TL-B2 and the upper patterns TL-U1 and TL-U2 may be respectively connected to the sensing pads PDT (see FIG. 5) different from each other.

The lower patterns TL-B1 and TL-B2 may be branched off from the first conductive pattern T1 (see FIG. 9) of the third trace lines TL3 located in the right region R-A, and the upper patterns TL-U1 and TL-U2 may be branched off from the second conductive pattern T2 (see FIG. 9) of the third trace lines TL3 located in the right region R-A.

The third trace lines TL3 located in the lower region B-A, in which the trace lines are densely located, may each include a single-layered metal layer, and ends of the third trace lines TL3 may be aligned with each other, and may not overlap each other, thereby reducing dead space of the lower region B-A for the trace lines to be located in.

Figure 14:
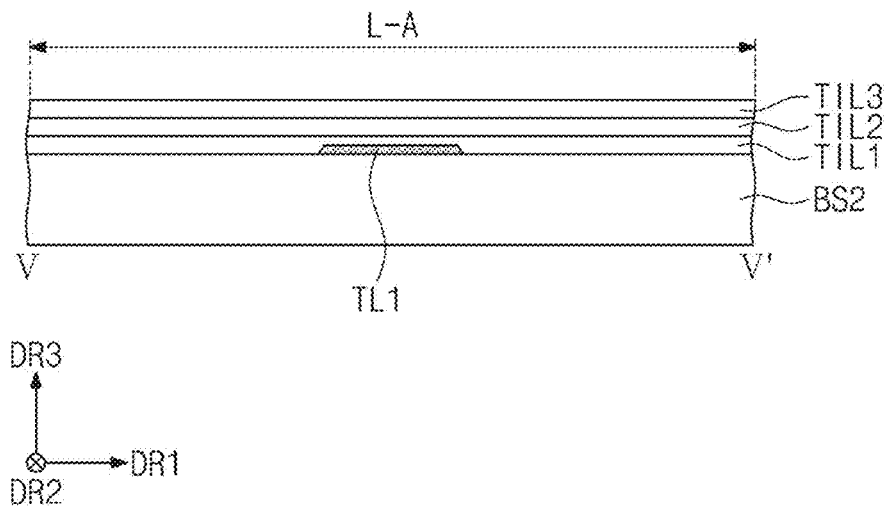
FIG. 14 is a cross-sectional view of a trace line according to one or more embodiments of the present disclosure.

FIG. 14 is a cross-sectional view of a trace line according to one or more embodiments of the present disclosure. FIG. 14 is a cross-sectional view related to the first trace lines TL1 located in the left region L-A among the first trace lines TL1 described with reference to FIG. 5.

The first trace line TL1 located in the left region L-A may include a single-layered metal layer. The first trace line TL1 may be included in the first conductive layer, may be located on the second substrate BS2 (encapsulation substrate), and may be covered with the first sensing insulating layer TIL1. Description of the first trace line TL1 located in the left region L-A may also be applied to the first trace line TL1 located in the upper region U-A and in the lower region B-A.

According to one or more embodiments of the present disclosure, in an input-sensing panel, an area size of a peripheral region for trace lines to be located in may not be increased, thereby reducing dead space. In addition, trace lines may include multi-layered conductive patterns, thereby providing a display device including an input-sensing panel having reduced resistance of the trace lines.

Although description has been made with reference to the embodiments of the present disclosure, it is understood that the present disclosure should not be limited to these embodiments, but various changes and modifications may be made by one ordinary skilled in the art within the spirit and scope of the present disclosure as hereinafter claimed. Therefore, the technical scope of the present disclosure is not limited to the contents described in the detailed description of the specification, but should be determined by the accompanying claims, with functional equivalents thereof to be included therein.

What is claimed is:

1. A display device comprising:
a display panel comprising an active region in which pixels are located, and a peripheral region adjacent to the active region; and
an input-sensing panel comprising a sensing circuit layer and an encapsulation substrate above the display panel,
wherein the sensing circuit layer comprises:
first, second, and third sensing insulating layers sequentially stacked above the display panel;
first sensing electrodes extending along a first direction, and arranged along a second direction crossing the first direction;
second sensing electrodes comprising sensing patterns arranged along the second direction, and connection patterns respectively between adjacent ones of the sensing patterns, extending along the second direction, and arranged along the first direction;
first trace lines respectively connected to first ends of the second sensing electrodes;
second trace lines respectively connected to second ends of the second sensing electrodes; and
third trace lines respectively connected to first ends of the first sensing electrodes, and comprising:
a first conductive pattern;
a second conductive pattern overlapping the first conductive pattern, and having a width that is less than a width of the first conductive pattern in the first direction; and a bridge pattern extending from one of the sensing patterns, and connected to the first conductive pattern and the second conductive pattern.

2. The display device of claim 1, wherein the first conductive pattern and the second conductive pattern comprise molybdenum-based metal, and
wherein the bridge pattern comprises a transparent conductive oxide.

3. The display device of claim 1, wherein the first conductive pattern is above the encapsulation substrate, and is covered by the first sensing insulating layer,
wherein the second conductive pattern is above the first sensing insulating layer, and is covered by the second sensing insulating layer, and
wherein the bridge pattern is above the second sensing insulating layer, and is covered by the third sensing insulating layer.

4. The display device of claim 3, wherein, in plan view, a portion of an upper surface of the first conductive pattern is exposed from the second conductive pattern.

5. The display device of claim 4, wherein a first contact hole overlapping the portion is defined in the first sensing insulating layer and the second sensing insulating layer,
wherein a second contact hole overlapping the second conductive pattern is defined in the second sensing insulating layer, and
wherein the bridge pattern is connected to the portion through the first contact hole, and is connected to the second conductive pattern through the second contact hole.

6. The display device of claim 4, wherein a contact hole overlapping the portion, and exposing a side surface and a portion of an upper surface of the second conductive pattern, is defined in the first sensing insulating layer and the second sensing insulating layer, and
wherein the bridge pattern is connected to the portion of the first conductive pattern, and to the side surface and the portion of the second conductive pattern, through the contact hole.

7. The display device of claim 3, wherein the connection patterns are above the encapsulation substrate, and are covered by the first sensing insulating layer,
wherein the sensing patterns and the second sensing electrodes are above the second sensing insulating layer, and are covered by the third sensing insulating layer, and
wherein the sensing patterns are connected to the connection patterns through connection contact holes defined in the first sensing insulating layer and the second sensing insulating layer.

8. The display device of claim 7, wherein the bridge patterns comprise integrated pattern extending from the sensing patterns.

9. The display device of claim 1, further comprising junction patterns adjacent to the first ends of the second sensing electrodes to which the first trace lines are connected, to the second ends of the second sensing electrodes to which the second trace lines are connected, and to the first ends of the first sensing electrodes to which the third trace lines are connected.

10. The display device of claim 9, wherein the junction patterns are above the encapsulation substrate, and are covered by the first sensing insulating layer, and
wherein the bridge pattern is connected to one of the junction patterns through a first junction contact hole defined in the first sensing insulating layer and the second sensing insulating layer.

11. The display device of claim 9, wherein the junction patterns are above the first sensing insulating layer, and are covered by the second sensing insulating layer, and
wherein the bridge pattern is connected to one of the junction patterns through a second junction contact hole defined in the second sensing insulating layer.

12. The display device of claim 1, wherein a portion of the third trace lines adjacent to the second ends of the second sensing electrodes comprises lower patterns above the encapsulation substrate,
wherein a remaining portion of the third trace lines adjacent to the second ends of the second sensing electrodes comprises upper patterns not overlapping the lower patterns, and
wherein, in plan view, ends of the lower patterns are respectively aligned with ends of the upper patterns.

13. The display device of claim 12, wherein one of the lower patterns is integrated with the first conductive pattern, and
wherein one of the upper patterns is integrated with the second conductive pattern.

14. The display device of claim 1, wherein the peripheral region comprises an upper region adjacent to an upper end of the active region, a left region adjacent to a left side of the active region, a lower region adjacent to a lower end of the active region, and a right region adjacent to a right side of the active region, and
wherein the input-sensing panel further comprises sensing pads in the lower region.

15. The display device of claim 14, wherein, in plan view, the third trace lines extend along the right region and the lower region, and are connected to the pads.

16. The display device of claim 15, wherein, in plan view, the first trace lines are connected to the first ends of the second sensing electrodes, extend along the upper region, the left region, and the lower region, and are connected to the sensing pads, and
wherein the second trace lines extend along the lower region, and are connected to the sensing pads.

17. The display device of claim 16, wherein the first trace lines comprise a single layer above the encapsulation substrate.

18. The display device of claim 1, wherein the first sensing electrodes and the second sensing electrodes at a corner of the active region are rounded.

19. The display device of claim 1, wherein the first, second, and third sensing insulating layers comprises an inorganic material.

20. The display device of claim 1, wherein the encapsulation substrate comprises glass, and
wherein the display device further comprises a coupling member overlapping the peripheral region, and configured to couple the display panel and the encapsulation substrate.

* * * * *